United States Patent
Dodds et al.

(10) Patent No.: US 10,758,931 B2
(45) Date of Patent: Sep. 1, 2020

(54) LIQUID COATING METHOD AND APPARATUS WITH A DEFORMABLE METAL ROLL

(71) Applicant: 3M INNOVATIVE PROPERTIES COMPANY, St. Paul, MN (US)

(72) Inventors: Shawn C. Dodds, St. Paul, MN (US); Mikhail L. Pekurovsky, Bloomington, MN (US); James N. Dobbs, Woodbury, MN (US); Graham M. Clarke, Woodbury, MN (US); Michele A. Craton, Cottage Grove, MN (US); Adam W. Kiefer, Woodbury, MN (US); Matthew R. D. Smith, Minneapolis, MN (US); Brian E. Schreiber, Elk River, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 89 days.

(21) Appl. No.: 15/579,980

(22) PCT Filed: Jun. 8, 2016

(86) PCT No.: PCT/US2016/036331
§ 371 (c)(1),
(2) Date: Dec. 6, 2017

(87) PCT Pub. No.: WO2016/200866
PCT Pub. Date: Dec. 15, 2016

(65) Prior Publication Data
US 2018/0133742 A1    May 17, 2018

Related U.S. Application Data (60) Provisional application No. 62/174,580, filed on Jun. 12, 2015, provisional application No. 62/250,205, filed on Nov. 3, 2015.

(51) Int. Cl.
*B05C 1/08* (2006.01)
*B05D 1/28* (2006.01)
*B05C 11/10* (2006.01)

(52) U.S. Cl.
CPC .......... *B05C 1/0808* (2013.01); *B05C 1/0869* (2013.01); *B05C 1/0895* (2013.01); *B05D 1/28* (2013.01); *B05C 11/1005* (2013.01)

(58) Field of Classification Search
CPC ........................... B05C 1/0808; B05C 1/0869
(Continued)

(56) References Cited

U.S. PATENT DOCUMENTS 3,552,353 A * 1/1971 Labombarde ............. B05C 1/02
118/70
3,756,760 A   9/1973 McBride
(Continued)

FOREIGN PATENT DOCUMENTS

CA      2034073     7/1991
CN     102917856    2/2013
(Continued)

OTHER PUBLICATIONS

Gutoff and Cohen, Coating and Drying Defects: Troubleshooting Operating Problems, Second Edition, 2006, p. 1-333 (Year: 2006).*
(Continued)

*Primary Examiner* — Tabatha L Penny
(74) *Attorney, Agent, or Firm* — Yufeng Dong (57) ABSTRACT

Methods and apparatuses for applying liquid coatings are provided. A first roll (14), a second roll (16), and a nip (146) formed between the first and second rolls are provided. A coating liquid (22) is supplied to the nip. The coating liquid is smoothed, via the nip, into a substantially uniform layer (22a) of liquid coating which is transferred to a substrate (12). The second roll (16) includes a thin metal shell (40)
(Continued)

and a resilient layer (30), the thin metal shell encases the resilient layer therebeneath, and the thin metal shell is capable of deflecting in unison with the resilient layer such that the thin metal shell is elastically deformable at the nip when in contact with the first roll (14).

20 Claims, 2 Drawing Sheets

(58) Field of Classification Search
    USPC ......................................................... 427/356
    See application file for complete search history.

(56) References Cited

U.S. PATENT DOCUMENTS

| 5,952,017 | A | 9/1999 | Nishida | |
|---|---|---|---|---|
| 6,673,391 | B1* | 1/2004 | Perkett | B05C 1/0808 427/207.1 |
| 6,977,011 | B2 | 12/2005 | Kustermann | |
| 2009/0029054 | A1* | 1/2009 | Yapel | B05D 1/40 427/359 |
| 2012/0316406 | A1 | 12/2012 | Rahman | |

FOREIGN PATENT DOCUMENTS

| DE | 4100771 | | 7/1991 | |
|---|---|---|---|---|
| DE | 4100771 | A1 * | 7/1991 | ............... B05C 1/14 |
| DE | 4421310 | | 12/1995 | |
| DE | 4421310 | A1 * | 12/1995 | ............. B41F 13/10 |
| EP | 0687575 | | 12/1995 | |
| EP | 1642248 | | 4/2006 | |
| EP | 2319410 | | 5/2011 | |
| WO | WO 2013-136251 | | 9/2013 | |
| WO | WO 2014-083490 | | 6/2014 | |

OTHER PUBLICATIONS

Gutoft, "Problems associated with roll coating and related processes", Coating and drying defects troubleshooting operating problem, second edition, 2006, pp. 75-91.

International Search report for PCT International Application No. PCT/US2016/036331 dated Aug. 23, 2016, 5 pages.

* cited by examiner

LIQUID COATING METHOD AND APPARATUS WITH A DEFORMABLE METAL ROLL

CROSS REFERENCE TO RELATED APPLICATIONS

This application is a national stage filing under 35 U.S.C. 371 of PCT/US2016/036331, filed Jun. 8, 2016, which claims the benefit of U.S. Application No. 62/174,580, filed Jun. 12, 2015; and U.S. Application No. 62/250,205, filed Nov. 3, 2015, the disclosures of which are incorporated by reference in its/their entirety herein.

TECHNICAL FIELD

The present disclosure relates to methods and apparatus of applying a liquid coating to a substrate by using a deformable roll including a thin metal shell.

BACKGROUND

Numerous industrial and consumer products include an aspect of coating in their manufacture in which one or more layers of liquid material are deposited onto a discrete object or onto a thin web of material of indefinite length being conveyed through a web path. It is frequently desirable to convey such a web at as great a speed as practicable through the web path in order to minimize the cost of production.

SUMMARY

Briefly, in one aspect, the disclosure describes a method including providing a first roll, a second roll, and a nip formed between the first and second rolls, supplying a coating liquid to the nip, and smoothing the coating liquid, via the nip, into a substantially uniform layer of liquid coating. The first roll includes a thin metal shell and a resilient layer, the thin metal shell encases the resilient layer therebeneath, and the thin metal shell is capable of deflecting in unison with the resilient layer such that the thin metal shell is elastically deformable at the nip when in contact with the second roll. The layer of liquid coating is transferred to a substrate. In some embodiments, the liquid coating is applied to a web of indefinite length material.

In another aspect, this disclosure describes a coating apparatus that includes a first roll including a thin metal shell and a resilient layer. The thin metal shell encases the resilient layer therebeneath, and the thin metal shell is capable of deflecting in unison with the resilient layer. A second roll forms a nip with the first roll such that the thin metal shell is capable of being elastically deformed at the nip when in contact with the second roll. A liquid delivery system is disposed to supply coating liquid into the nip.

Various unexpected results and advantages are obtained in exemplary embodiments of the disclosure. One such advantage of exemplary embodiments of the present disclosure is that a very thin (e.g., no greater than 5 microns, or even no greater than 2.5 microns), continuous liquid coating can be transferred to a substrate with controlled defect levels such as ribbing defects discussed below.

Ribbing defects are often observed in conventional roll coating processes for liquid coatings, for example, when the coating liquid has a viscosity of about 0.1 mPa·S or greater. The defects may occur as a coating liquid passes through a nip between rolls and the viscous stress at a film split overcomes surface tension forces attempting to maintain a uniform curvature of the interface at the film split. The balance of viscous to surface tension forces can be described by a dimensionless capillary number defined by the equation $Ca=\mu U/\sigma$, where $Ca$ is the capillary number, $\mu$ is a liquid viscosity, $U$ is an average speed of the first and second rolls, and $\sigma$ is the liquid surface tension. The ribbing defect may lead to a highly non-uniform coating as the liquid exits the nip. While this may be a tolerable coating defect if the ribs or ribbing defects are able to level when line speeds of the rotating rolls are low, it can limit line speeds, reduce the coating efficiency, and increase the cost of production. Additionally, as line speeds are increased it can lead to misting, for example, ejection of small droplets in the form of a mist as the ribs pass through the nip, which can be a concern for the health and safety of the factory environment.

In some embodiments described herein, the above ribbing defects in liquid coatings can be impacted, altered, or adjusted by placing a thin metal shell on the outside of a deformable roll having an underlying resilient layer. The mechanics of deformation of the roll surface at the nip may be significantly altered, leading to a change in the pressures developed in the nip, and hence to a change in the character of the ribbing instability. In some embodiments, liquid coating methods are provided that can substantially decrease the number of ribs present in a liquid roll coating nip, for example, a forward roll coating nip, for a given line speed above a critical value of the capillary number, for example, about 0.1 dimensionless units or greater.

Additionally, in some embodiments, roll coating of thin liquid layers onto a substrate may require the use of at least one deformable roll in the nip to provide improved uniformity at a low enough flowrate to achieve the target caliper, which would require increasingly perfect steel rolls in a rigid system. This deformability is typically achieved with rubber rolls, which are susceptible to damage and wear during operation in the absence of a thin metal shell. Such damage and wear can negatively impact the coating quality. The damage or wear can come from sources as benign as substrate splices and edges, especially when operating at high speeds. By covering the resilient layer with a thin metal shell, the durability of the roller is dramatically improved, without affecting the ability to deform the roll and achieve thin coatings.

Listing of Exemplary Embodiments

Exemplary embodiments are listed below. It is to be understood that any one of the embodiments 1-15 and 16-24 can be combined.

Embodiment 1 is a method, comprising:
  providing a first roll, a second roll, and a nip formed between the first and second rolls;
  supplying a coating liquid to the nip; and
  smoothing the coating liquid, via the nip, into a substantially uniform layer of liquid coating,
  wherein the first roll comprises a thin metal shell and a resilient layer, the thin metal shell encases the resilient layer therebeneath, and the thin metal shell is capable of deflecting in unison with the resilient layer such that the thin metal shell is elastically deformable at the nip when in contact with the second roll, and
  wherein the layer of liquid coating is transferred to a substrate.

Embodiment 2 is the method of embodiment 1, wherein the layer of liquid coating has a thickness no greater than about 5 microns.

Embodiment 3 is the method of embodiment 1 or 2, wherein the thin metal shell is configured to be removable from the first roll.

Embodiment 4 is the method of any one of embodiments 1-3, wherein the first roll further comprises a rigid central core, and the resilient layer has substantially uniform thickness about the periphery of the rigid central core.

Embodiment 5 is the method of any one of embodiments 1-4, wherein the substrate is a web of indefinite length, and the method further comprises wrapping the web around one of the first and second rolls.

Embodiment 6 is the method of any one of embodiments 1-5, further comprising determining a line speed at which one of the first and second rolls is rotated, the predetermined line speed and the viscosity of the coating liquid are such that a calculated capillary number Ca for the coating is greater than a critical value.

Embodiment 7 is the method of embodiment 6, further comprising rotating one of the first and second rolls at the predetermined line speed.

Embodiment 8 is the method of embodiment 6 or 7, wherein the critical value of the capillary number Ca is in the range from about 0.1 to about 2, and the capillary number Ca is no greater than 500.

Embodiment 9 is the method of any one of embodiments 1-8, wherein the thin metal shell comprises nickel.

Embodiment 10 is the method of any one of embodiments 1-9, wherein the thin metal shell has a thickness between about 0.1 mm and about 1 mm.

Embodiment 11 is the method of any one of embodiments 1-10, wherein the thin metal shell has a surface roughness of about 10 microns or less.

Embodiment 12 is the method of any one of embodiments 1-11, wherein the resilient layer is compressible and capable of preventing slip between the thin metal shell and the resilient layer.

Embodiment 13 is the method of any one of embodiments 1-12, wherein the resilient layer is made of a foam.

Embodiment 14 is the method of any one of embodiments 1-13, wherein the resilient layer includes a patterned elastomer.

Embodiment 15 is the method of any one of embodiments 1-14, wherein the liquid coating has a thickness no less than about 0.5 microns.

Embodiment 16 is a coating apparatus, comprising:

a first roll comprising a thin metal shell and a resilient layer, the thin metal shell encases the resilient layer thereebeneath, and the thin metal shell is capable of deflecting in unison with the resilient layer;

a second roll forming a nip with the first roll such that the thin metal shell is capable of being elastically deformed at the nip by contact with the second roll; and a liquid delivery system disposed to supply coating liquid into the nip.

Embodiment 17 is the coating apparatus of embodiment 16, wherein the thin metal shell is configured to be removable from the layer of resilient material.

Embodiment 18 is the coating apparatus of embodiment 16 or 17, wherein the first roll further comprises a rigid central core, and the resilient layer has substantially uniform thickness about the periphery of the rigid central core.

Embodiment 19 is the coating apparatus of any one of embodiments 16-18, wherein the thin metal shell comprises nickel.

Embodiment 20 is the coating apparatus of any one of embodiments 16-19, wherein the thin metal shell has a thickness between about 0.1 mm and about 1 mm.

Embodiment 21 is the coating apparatus of any one of embodiments 16-20, wherein the ratio between the thickness of the thin metal shell and the diameter of the first roll is between 1:15000 and 1:80.

Embodiment 22 is the coating apparatus of any one of embodiments 16-21, wherein the second roll is a rigid roll.

Embodiment 23 is the coating apparatus of any one of embodiments 16-22, further comprising a rotation mechanism configured to rotate one of the first and second rolls at a predetermined line speed, wherein the predetermined line speed and the viscosity of the coating material are such that a calculated capillary number Ca for the coating is greater than a critical value, and the critical value is about 0.1 or more.

Embodiment 24 is the coating apparatus of any one of embodiments 16-23, wherein the resilient layer is made of a foam.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying drawings, in which.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should understood that:

In this application, the term "elastically deformed" means a deformed object (e.g., a thin metal shell) being capable of substantially 100% (e.g., 99% or more, 99.5% or more, or 99.9% or more) recovering to its original state.

In this application, the term "nip" refers to a system of two or more rolls with (i) a gap between adjacent first and second rolls where the distance between the center of the first and second rolls is greater than or equal to the sum of the radii of the two rolls, or (ii) an impression between adjacent first and second rolls when the distance between the center of the first and second rolls is less than the sum of the radii of the two rolls.

In this application, the terms "polymer" or "polymers" includes homopolymers and copolymers, as well as homopolymers or copolymers that may be formed in a miscible blend, e.g., by coextrusion or by reaction, including, e.g., transesterification. The term "copolymer" includes random, block and star (e.g. dendritic) copolymers.

In this application, by using terms of orientation such as "atop", "on", "over," "covering", "uppermost", "underlying" and the like for the location of various elements in the disclosed coated articles, we refer to the relative position of an element with respect to a horizontally-disposed, upwardly-facing substrate (e.g., web). However, unless otherwise indicated, it is not intended that the substrate (e.g., web) or articles should have any particular orientation in space during or after manufacture.

In this application, by using the term "overcoated" to describe the position of a layer with respect to a substrate (e.g., web) or other element of an article of the present disclosure, we refer to the layer as being atop the substrate (e.g., web) or other element, but not necessarily contiguous to either the substrate (e.g., web) or the other element.

In this application, the terms "about" or "approximately" with reference to a numerical value or a shape means +/−five percent of the numerical value or property or characteristic, but expressly includes the exact numerical value. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

In this application, the term "substantially" with reference to a property or characteristic means that the property or characteristic is exhibited to a greater extent than the opposite of that property or characteristic is exhibited. For example, a substrate (e.g., web) that is "substantially" transparent refers to a substrate (e.g., web) that transmits more radiation (e.g. visible light) than it fails to transmit (e.g. absorbs and reflects). Thus, a substrate (e.g., web) that transmits more than 50% of the visible light incident upon its surface is substantially transparent, but a substrate (e.g., web) that transmits 50% or less of the visible light incident upon its surface is not substantially transparent.

In this application, the singular forms "a", "an", and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

As used in this application, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the specification and more particularly the Listing of Exemplary Embodiments and the claims can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Exemplary embodiments of the present disclosure may take on various modifications and alterations without departing from the spirit and scope of the present disclosure. Accordingly, it is to be understood that the embodiments of the present disclosure are not to be limited to the following described exemplary embodiments, but are to be controlled by the limitations set forth in the claims and any equivalents thereof.

Methods and apparatuses are described herein for liquid coating on a substrate. In a liquid coating process, a coating liquid is supplied to pass through a nip where the coating liquid undergoes a film split, resulting in some coating liquid on both rolls of the lip. Various unexpected results and advantages are obtained in exemplary embodiments of the disclosure. One such advantage of exemplary embodiments of the present disclosure is that a very thin (e.g., no greater than 5 microns, or even no greater than 2.5 microns before drying or curing), continuous liquid coating can be transferred to a substrate with controlled defect levels.

Figure 1:
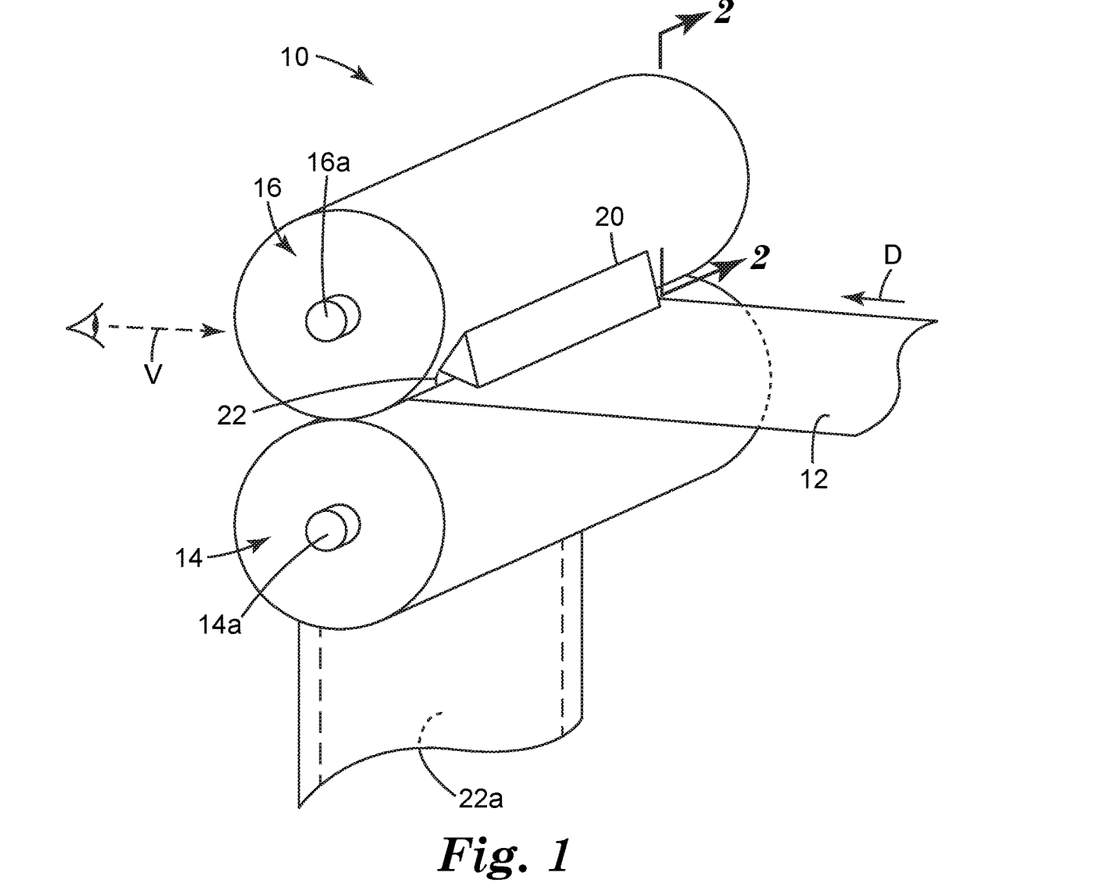
FIG. 1 is a perspective view of a coating apparatus carrying out a portion of a first embodiment of the disclosure.

Various exemplary embodiments of the disclosure will now be described with particular reference to the Drawings. Referring now to FIG. 1, a perspective view of a coating apparatus 10 for carrying out a portion of one embodiment of the disclosure is illustrated. In this view, a web 12 of indefinite length material is being conveyed in a machine direction "D" into a nip 146 between a first roller 14 and a second roller 16. The nip 146 can be, for example, a gap between the adjacent first and second rolls 14 and 16 where the distance between the center of the first and second rolls is greater than or equal to the sum of the undeformed radii of the two rolls, or (ii) an impression between adjacent first and second rolls 14 and 16 when the distance between the center of the first and second rolls is less than the sum of the undeformed radii of the two rolls. Regarding values or magnitudes of the nip or impression, the absolute difference between the above distance and sum can be, for example, about 0 microns, about 25 microns, about 100 microns, about 500 microns, about 1 mm, about 10 mm, or any values therebetween. Each of the first roller 14 and the second roller 16 is rotatably mounted on shafts 14a and 16a, respectively.

The shafts 14a and 16a may individually be live or dead shafts, and are in turn supported by structure omitted from the drawing for visual clarity. A coating die 20 is positioned to dispense coating liquid 22 onto the web 12. It is to be understood that any suitable liquid delivery systems or means may be used to supply the coating liquid, ranging from simple systems such as pans or troughs, to complex fluid delivery systems such as die coaters. The nip 146 between the first roller 14 and the second roller 16 splits the supplied coating liquid into the form of films onto both the rollers 14 and 16, and smooths the coating liquid into a thin, substantially uniform liquid layer 22a on the web 12, which is presented in FIG. 1 by dashed lines referring to the far side of the web 12. Designated by a dashed arrow "V" is the direction of vision used to take the photographs of the downstream side of the nip 146 between the first roller 14 and the second roller 16. In some embodiments, rotation mechanisms may be conveniently provided to rotate the first roller 14 and the second roller 16 against each other, with substantially the same, or different surface rotational speeds. The rollers 14 and 16 may be both independently driven rolls, or one of them may be arranged to drive the other via, e.g. contact friction, drive belt, or direct gearing.

In the depicted embodiment, the liquid layer 22a is directly coated onto the web 12. It is to be understood that the liquid layer 22a can be applied directly or indirectly onto any suitable substrates to form continuous wet coatings thereon. In some embodiments, additional roller(s), for example, 3 or 5 roll coating, can be used to transfer the liquid layer 22a to a substrate to form continuous liquid coatings thereon. In the present disclosure, the term "substrate" is used to describe one or more solid materials upon which the coating liquid is placed, and thereafter transported through the remainder of a process (e.g., any drying/curing, converting, storage, winding, operations etc.). A substrate can be either rigid or flexible, and of either of definite or indefinite length. Suitable substrate materials can include, for example, polyethylene terephthalate (PET), polyester (PE), polycarbonate (PC), polypropylene (PP), polyimide (PI), polyolefins, polyvinyls, acetates, papers or other fibrous materials (e.g., including blown microfibers or woven fabrics), foams, glass, metals (e.g., aluminum or stainless steel), or any combination of the above such as, for example, a polyester coated paper. It is to be understood that the substrate can have any suitable dimensions. For example, the substrate can be thin (e.g., less than 10 microns) or thick (e.g., greater than 10 mm), narrow (e.g., less than 1 cm) or wide (e.g., greater than 300 cm), short (e.g., less than 1 m) or long (e.g., many thousands of meters).

In some embodiments, the liquid layer 22a can have a thickness, for example, no greater than about 100 microns, no greater than about 20 microns, no greater than about 5 microns, no greater than about 4 microns, no greater than about 3 microns, no greater than about 2 microns, or no greater than about one micron. The thickness of the liquid layer 22a can be, for example, no less than about 0.1 microns, no less than about 0.2 microns, no less than about 0.3 microns, no less than about 0.5 microns, or no less than about 1 micron. The thickness of the liquid layer 22a can be in the range, for example, from about 0.1 microns to about 500 microns, from about 0.2 microns to about 100 microns, from about 0.5 microns to about 50 microns, from about 0.5 microns to about 10 microns, or more preferably from about 0.5 microns to about 5 microns.

In some embodiments, the liquid layer 22a coated on a substrate can be dried or cured in following processes. For example, in some embodiments, the liquid layer 22a can be cured by heat or radiation, and the thickness of the cured layer can be substantially the same as the original liquid layer before curing. In some embodiments, the liquid layer 22a can be dried by evaporating solvent therefrom, and the dried layer can be thinner (e.g., 10% thinner, 20% thinner, 30% thinner, 40% thinner, or 50% thinner) than the original liquid layer.

Figure 2:
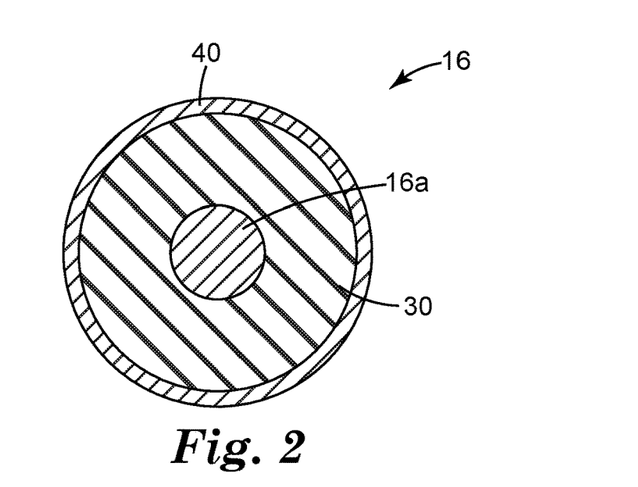
FIG. 2 is a cross-section side view through one of the rollers of FIG. 1, taken along section lines 2-2.

Referring now to FIG. 2, a cross-section side view through the second roller 16, taken along section lines 2-2 in FIG. 1, is illustrated. The rigid shaft 16a (a live shaft in this convenient embodiment) is surrounded by a resilient layer 30. Around the resilient layer 30 is a thin metal shell 40. The resilient layer 30 conveniently has a hardness that yields to a certain extent, but does not allow the thin metal shell 40 to deform beyond its elastic limit by the pressures in the nip 146. To achieve this criterion, the resilient layer 30 may conveniently include elastic materials such as, for example, a rubber with a hardness within an appropriate range, for example, no less than 20, 40, 60, 80, or 100 Shore A, and no greater than 100, 80, 60, 40, or 20 Shore D. In some embodiments, the resilient layer 30 may be compressible and capable of preventing slip between the thin metal shell 40 and the resilient layer 30. In some embodiments, the compressible resilient layer 30 may be made of a foam. In some embodiments, the compressible resilient layer 30 may include a patterned elastomer that allows the resilient layer 30 to be effectively compressible. The patterned elastomer may have patterned structures (e.g., engraved surface structures) located on the outer surface 32 of the resilient 30 that contacts to the thin metal shell 40. The patterned structure may be formed by imparting onto the surface of the rubber with any suitable techniques including, for example, engraving, ablating, molding, etc.

The second roller 16 is conveniently produced by physically mounting the thin metal shell 40 on top of the resilient layer 30 which can be, for example, a rubber core. The metal shell 40 is much "thinner" as compared to the diameter of the second roller 16. In some embodiments, the ratio between the thickness of the metal shell 40 and the diameter of the second roller 16 may be, for example, no greater than 1:20, no greater than 1:50, no greater than 1:80, no greater than 1:100, no greater than 1:200, or no greater than 1:500. The ratio may be, for example, no less than 1:20000, no less than 1:15000, no less than 1:5000, or no less than 1:2000. A useful range of the ratio may be, for example, from about 1:2000 to about 1:200. In some embodiments, the thin metal shell 40 may have a thickness of, for example, not greater than 1.5 mm, not greater than 1 mm, not greater than 0.7 mm, not greater than 0.6 mm, or not greater than 0.5 mm. The thickness of the thin metal shell 40 may be, for example, no less than 0.05 mm, no less than 0.08 mm, no less than 0.1 mm, or no less than 0.12 mm. A useful range of the metal shell thickness may be, for example, between about 0.1 mm and about 0.6 mm. The diameter of the second roller 16 may be, for example, no greater than 2000 mm, no greater than 1000 mm, no greater than 500 mm, or no greater than 300 mm. The diameter of the second roller 16 may be, for example, no less than 10 mm, no less than 20 mm, no less than 50 mm, or no greater less than 100 mm. A useful range of the diameter may be, for example, between about 100 mm to about 250 mm.

The thin metal shell 40 may have a roughness at the outer surface 42 thereof about 10 microns or less, about 5 microns or less, about 2 microns or less, or about 1 micron or less. The thin metal shell 40 may be made of metals or metal alloys having relatively low modulus of elasticity and high yield strain including, for example, nickel, stainless steel, copper, chrome, alloys and combinations thereof, etc. In some embodiments, the thin metal shell may include multiple metal layers, for example, a layer of copper covered by a layer of chrome. The thin metal shell 40 is flexible and is capable of deflecting in unison with the resilient layer 30 therebeneath such that the thin metal shell 40 can be elastically deformed at the nip by contact with another roller.

More specifically, in some embodiments, it may be advantageous to mount the thin metal shell 40 onto the resilient layer 30 in such a way as to produce an interference fit between the mating parts, for example, by locking the thin metal shell 40 in place to prevent motion of the thin metal shell 40 when it is nipped against the first roller 14. In some embodiments, the interference fit between the thin metal shell and the resilient layer may be introduced by, for example, shaping the mating parts so that the one or the other, or both, can slightly deviate in size from nominal dimensions. For example, the resilient layer 30 may be slightly oversized and the thin metal shell 40 may be slightly undersized. When the resilient layer 30 is pressed into the thin metal shell 40, the resilient layer 30 may elastically deform slightly to generate an interference fit with the thin metal shell 40. In some embodiments, temperatures of the mating parts, i.e., the resilient layer 30 and the thin metal shell 40, may be controlled to utilize the different thermal properties (e.g., thermal expansion or contraction) of the respective materials (e.g., metal versus rubber). In some embodiments, the contacting surfaces of one, another, or both of the mating parts may be textured to improve the interference fit.

In some embodiments, the use of an interference fit between the resilient layer and the thin metal shell, however, may create challenges due to the nearly incompressible nature of most elastomeric rubber coatings. This nearly incompressible nature means that any mass of rubber that is displaced from one location must migrate to another location, and so in the context of the fit between the resilient layer and the thin metal shell will result in slippage of the thin metal shell over the resilient layer. This challenge can be overcome by using a compressible resilient layer, such as a foam, or by placing grooves in more typical elastomeric rubber to give the displaced rubber a place to go, and make an effectively compressible resilient layer.

In some embodiments, the thin metal shell 40 can be removably mounted onto the resilient layer 30 with an interference fit via any suitable assembling processes. For example, the temperature of the assembly of thin metal shell 40 and resilient layer 30 may be controlled to adjust the dimensions of the mating parts so as to allow the thin metal shell 40 to slide off the resilient layer 30 without damaging the mating parts.

In many embodiments, methods and apparatus described herein can be applied to form thin liquid coatings on a substrate. In a liquid coating process, a common means of applying a liquid onto a moving substrate is through a class of coating techniques known as roll coating. This class includes methods such as, for example, direct roll coating, reverse roll coating, forward or reverse offset roll coating, five roll coating, and many other variants. While there are differences between all of these methods, the common tie is the formation of one or more nips between adjacent first and second rolls, and optionally a web wrapped around the first or second roll. A coating liquid is supplied to the nip using a liquid delivery system, after which the coating liquid passes through the nip and undergoes a film split, resulting in some coating liquid on both the first roll and the second roll. A deeper discussion of the various types of roll coating and their underlying physics can be found in literature such as Coyle (PhD thesis, University of Minnesota, 1984), Benjamin (PhD thesis, University of Minnesota, 1994), and Carvalho (PhD thesis, University of Minnesota, 1996).

Ribbing defects may occur as a fundamental coating defect in conventional rubber roll coating systems when a liquid passes through a diverging gap, which results in a highly non-uniform coating as the liquid exits the nip. Because this is a viscous effect, it is governed by a capillary number, $Ca=\mu V/\sigma$, where $\mu$ is the liquid viscosity, V is the average speed of two rotating rolls (i.e., line speed), and $\sigma$ is the interfacial tension of the liquid. Ribbing defects may be observed when the capillary number becomes greater than a critical limit, for example, when the line speed of process rises above a critical value for given coating materials (e.g., a coating liquid). Further increases in the line speed above the critical value may increase the frequency of the ribs produced, and eventually can lead to the ejection of small droplets in the form of a mist as the ribs pass through the nip. Not only can this mist affect the product quality, but it is also an environment, health and safety concern. Thus, the above ribbing induced problems may significantly limit the line speed for conventional rubber roll coating systems and methods when applying a liquid coating to a web.

This disclosure describes apparatuses and methods of liquid roll coating where a first roll includes a thin metal shell and a resilient layer, the thin metal shell encases the resilient layer therebeneath, and the thin metal shell is capable of deflecting in unison with the resilient layer such that the thin metal shell is elastically deformable at the nip by contact with the second roll. It is to be understood that the construction of the first roll including the thin metal shell and the resilient layer disclosed herein could be applied equally well in variants of roll coating listed above, e.g., direct roll coating, reverse roll coating, forward or reverse offset coating, five roll coating, or any other roll coating methods.

The methods and apparatus described herein can impact, alter, or adjust the above ribbing defects by using a deformable roll including a thin metal shell such as, for example, the second roller 16 shown in FIGS. 1 and 2, especially when the line speeds of the rolls are in a relatively higher speed region. In some embodiments, application of a thin metal shell to a roll coating system can fundamentally alter characteristic behavior of ribbing, resulting in a much more uniform liquid coating compared to conventional rubber roll coating systems and methods.

In some embodiments, the line speeds of the rolls can be determined based on the properties of a given coating liquid, and the first and second rollers 14 and 16 of FIG. 1 can be rotated in contact with each other at the predetermined line speed with a diminished impact from the ribbing defects. For example, the predetermined line speed and the viscosity of the coating liquid are such that the corresponding capillary number Ca for the coating can be controlled to be greater than a critical value. Above the critical value, using a thin metal shell such as in some embodiments described herein can significantly reduce ribbing defects as compared to conventional rubber roll coating systems and methods. In some embodiments, the critical value can be, for example, no less than 0.01, no less than 0.02, no less than 0.05, no less than 0.1, or no less than 0.2. The critical value can be, for example, no greater than 100, no greater than 10, no greater than 2, or no greater than 1. A typical critical capillary number for ribbing-style defects may be close to 0.1. In some embodiments, the critical value of the capillary number Ca may in the range, for example, from about 0.1 to about 2. It is to be understood that the critical value of capillary number may vary with properties of the specific coating liquid (e.g., viscosity), and with the properties of particular roll coating systems.

In some embodiments, the methods and apparatuses described herein can be applied to liquid coatings having a capillary number Ca, for example, no less than about 0.1, no less than about 0.5, or no less than about 2. In some embodiments, the methods and apparatuses described herein can be applied to liquid coatings having a capillary number Ca, for example, not greater than about 1000, not greater than about 500, or not greater than about 200.

In some embodiments, only one of the first and second rolls 14 and 16 that is wrapped by the web 12 needs to rotate at a predetermined first line speed, and the other roll is free to rotate at a second speed that may be independent from the predetermined first line speed. In some embodiments, the first and second rolls 14 and 16 may even rotate at different directions. While FIG. 1 illustrates the first roll 14 being wrapped by the web 12, and therefore in this example it is the first roll 14 which rotates at a predetermined line speed, it is to be understood that in other embodiments, the second roll 16 may be wrapped by the web 12. It is also to be understood that in more complex roll arrangements, such as three roll or five roll coating, one or more nips may be present in which only one roll will be wrapped by the web 12. In these more complex systems, each nip can be treated as an assembly of a first roll 14 and a second roll 16, optionally with a web 12.

Various unexpected results and advantages are obtained in exemplary embodiments of the disclosure. One such unexpected results of exemplary embodiments of the present disclosure is that a very thin, continuous liquid coating can be transferred to a substrate with controlled defect levels such as ribbing defects. In some embodiments, significant reduction of ribbing defects at high line speeds (e.g., much less elongated ribs as to be discussed in Examples further below) may be observed. This is surprising given that the skin of thin metal shell should in-theory increase the effective durometer of the deformable roll (e.g., the second roller 16 of FIG. 2). The increased effective durometer would lead to an increased tendency for ribbing, which is known in the academic literature (see, e.g., Marcio Carvalho, PhD thesis from University of Minnesota, 1996), and one would expect the ribbing defects may become more pronounced when the thin metal shell is present. While not to be bound by theory, it is believed that the observed unexpected results may be due to the change in the characteristics of ribs, which may have a substantial impact on misting in roll coatings. In this disclosure, the ribs are much less elongated by using a thin metal shell, and it is much less likely to eject satellite drops.

The operation of the present disclosure will be further described with regard to the following detailed examples. These examples are offered to further illustrate the various specific and preferred embodiments and techniques. It should be understood, however, that many variations and modifications may be made while remaining within the scope of the present disclosure.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Example 1

A coating apparatus generally as illustrated in FIG. 1 was constructed. To prepare the second roller 16, a rubber sleeve about 15 to 20 cm in width and about 10 to 15 cm in outside diameter, commercially available as Load'n'Lok from Luminite Products Corporation of Bradford, Pa., was obtained. The rubber sleeve has surface textures (e.g., grooves) that may allow the rubber to deform into the grooves, making the rubber more compressible near its outer surface. It is believed that this treatment is useful in ensuring that the fit between the rubber sleeve and the metal shell discussed below is uniform across the entire area of contact.

A nickel shell about 12 to 18 cm in width, about 10 to 15 cm in inside diameter, and about 0.1 to 0.5 mm in thickness was slid onto the rubber sleeve to achieve an interference fit therebetween.

A nip was produced between this roll and a rigid, stainless steel backup roll 90 mm in diameter. The steel roll was brought into contact with the sleeve construction described above, producing a footprint of roughly 1 to 5 mm. A thin red mark was placed across one edge of the nickel surface and onto the rubber outside the nickel to track the possibility of displacement from the original position of the sleeve around the rubber underlayer. The coating rolls were then rotated together at speeds ranging from 1 m/min to 30 m/min, and at various levels of impression, from a gap of 0" up to 0.020" (0.051 cm), while tracking the position of the red mark. Additionally, a skew in the gap between the two rolls was imposed, as severe as a 0.010" (0.0254 cm) difference between the left and right sides of the nip. The nickel shell did not move from its original position in any of these cases, demonstrating that this is a robust approach to mounting the nickel onto a rubber surface.

Figure 3:
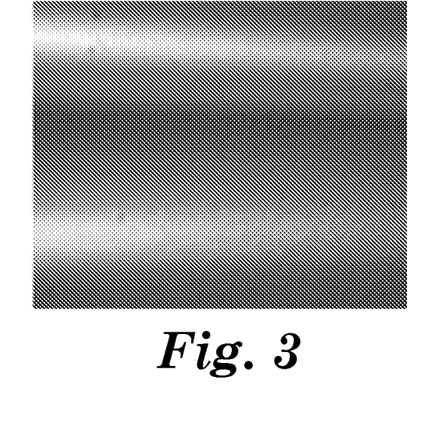
FIG. 3 is a photograph of the experiment described in Example 1.

Experiments were performed to determine the ability of the apparatus to impact, alter, or adjust ribbing defects. The nipped rollers of this Example as described above were used in a coating process as described below. The nipped rollers were rotated at a speed that would correspond with a web speed of about 13.5 m/min. A few mL of mineral oil with a viscosity of about 5,313 cP, commercially available as CAP8L fluid from Brookfield Engineering Laboratories of Middleboro, Mass. was dispensed onto the steel roll, eventually forming a coating bead and simulating a coating process. For this coating speed and viscosity, a capillary number Ca of approximately 40 can be calculated. A high-speed camera, commercially available as FASTCAM ULTIMA APX from Photron of San Diego, Calif., was used to take capture images of the nip (from vantage point V in FIG. 1) at 500 frames per second. A representative frame from this recording is presented as FIG. 3. It will be observed that the degree of ribbing is minimal.

Comparative Example C1

Figure 4:
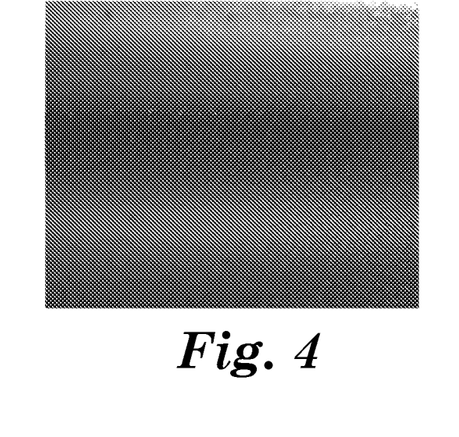
FIG. 4 is a photograph of the experiment described in comparative Example C1.

This comparative Example is the same as Example 1, except that the nickel shell has not been applied to the rubber roll. A representative frame from the camera is presented as FIG. 4. It will be seen that compared to Example 1, the ribbing is slightly more pronounced.

Example 2

Figure 5:
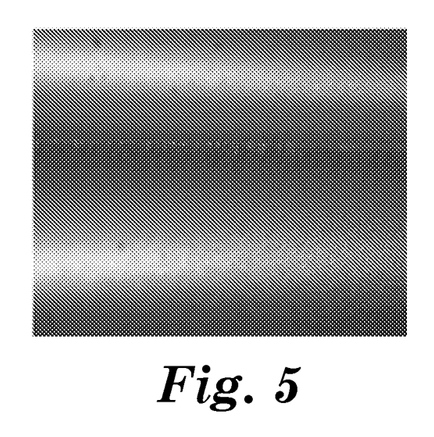
FIG. 5 is a photograph of the experiment described in Example 2.

This Example is the same as Example 1, except that the rotation speed of the nip has been increased so as to represent a line speed of 15 m/min. A capillary number Ca for the process of approximately 45 can therefore be calculated. A representative frame from the camera is presented as FIG. 5.

Comparative Example C2

Figure 6:
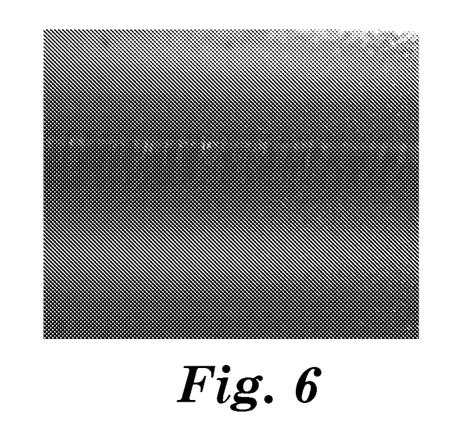
FIG. 6 is a photograph of the experiment described in comparative Example C2.

This comparative Example is the same as Example 2, except that the nickel shell has not been applied to the rubber roll. A representative frame from the camera is presented as FIG. 6. It will be seen that compared to the results for Example 2 as shown FIG. 5, the ribbing is far more pronounced, for example, the ribs shown as white lines are more elongated along the machine direction in FIG. 6.

Example 3

Figure 7:
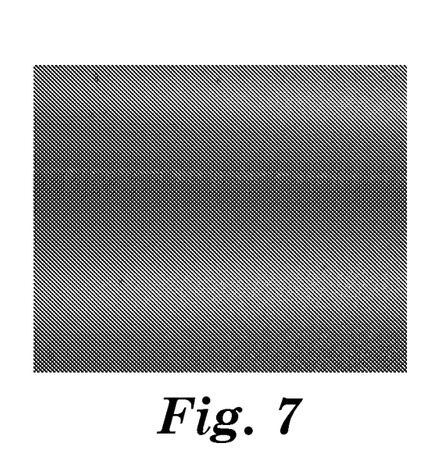
FIG. 7 is a photograph of the experiment described in Example 3.

This Example is the same as Example 1, except that the rotation speed of the nip has been increased so as to represent a line speed of 30 m/min. A Ca for the process of approximately 90 can therefore be calculated. A representative frame from the camera is presented as FIG. 7.

Comparative Example C3

Figure 8:
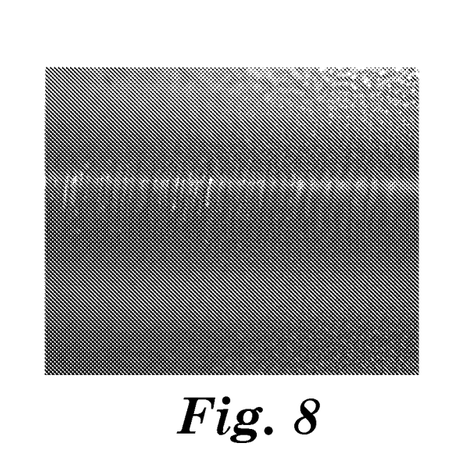
FIG. 8 is a photograph of the experiment described in comparative Example C3.

This comparative Example is the same as Example 3, except that the nickel shell has not been applied to the rubber roll. A representative frame from the camera is presented as FIG. 8. It will be seen that compared to Example 3, the ribbing is far more pronounced, for example, the ribs shown as white lines are much more elongated along the machine direction in FIG. 7.

Looking at the results for all the Examples shown in FIGS. 3-8, it is seen that at relatively slower speeds (e.g., at 13.5 m/min in FIGS. 3 and 4) the ribbing instability itself appears to be present to roughly the same degree for Examples 1-3 and the corresponding Comparative Examples C1-C3, and the differences in the character of the ribs is subtle. However, as the speed (or capillary number) of the system is increased, the ribs present on the rubber roll of Comparative Examples C1-C3 become extended, and translate well beyond the nip, whereas the ribs on the nickel covered rubber roll of Examples 1-3 do not change substantially with the line speed. This divergence seems to take place above a capillary number Ca for the above systems of approximately 40 in this particular example. Coating apparatus according to Examples 1-3 are therefor particularly efficacious when including means for rotating the first and second roll in contact with each other at a predetermined line speed, where the predetermined line speed and the viscosity of the coating material are such that the calculated Ca for the coating is greater than a critical value which is about 40 for Examples 1-3.

While the results shown for Examples 1-3 may not be able to completely eliminate the ribs, the using of thin metal shell is able to fundamentally alter the characteristic behavior of ribbing defects, resulting in a much more uniform coating relative to the traditional rubber roll coating system, especially when the line speed increases to be above the critical value (e.g., 13.5 m/min corresponding to a capillary number of 40).

Example 4

In this example, a coating apparatus was created by coupling a deformable roll (with the properties described in Table 1) with a rigid steel roll on a webline. The constructions used in this example are similar to that used in Example 1-3 and Comparative Example C1-C3. A substrate (DuPont ST-505 film) was wrapped around the steel roll and transported through the webline at a speed of 2.7 m/min. The deformable roll was also rotated at 2.7 m/min in this example. A coating liquid (MacDermid Print and Peel, 25% solids by weight) was applied to the upstream end of the nip using a syringe, after which the liquid passed through the nip and underwent a film split, transferring partially onto the substrate. The coating liquid and substrate were subsequently transported through an oven, so that the coating was dried. The dried coating thickness was measured using a 4"×6" die cut, with the wet coating thickness calculated based on this dry measurement and the known solids content. This process was repeated for a variety of impression levels with each of the rolls listed in Table 1 below where the minimum wet coating thickness is summarized. Detailed results from these experiments are presented in Table 2.

TABLE 1

| Roll # | Rubber hardness | Metal shell | Minimum wet coating thickness achieved |
|---|---|---|---|
| 1 | 60 Shore A | N/A | 14.1 μm |
| 2 | 90 Shore A | N/A | 5.3 μm |
| 3 | 60 Shore A | 500 μm | 2.3 μm |
| 4 | 90 Shore A | 500 μm | 0.5 μm |

TABLE 2

| | Roll #1 | | Roll #2 | | Roll #3 | | Roll #4 | |
|---|---|---|---|---|---|---|---|---|
| Impression (mils) | Dry Thickness (μm) | Wet Thickness (μm) | Dry Thickness (μm) | Wet Thickness (μm) | Dry Thickness (μm) | Wet Thickness (μm) | Dry Thickness (μm) | Wet Thickness (μm) |
| -4 | 10.89 | N/A | 15.55 | 74.77 | 8.77 | 42.14 | 14.17 | 68.12 |
| -2 | 8.29 | 52.36 | 7.39 | 35.51 | 5.90 | 28.36 | 6.38 | 30.66 |
| 0 | 6.52 | 31.35 | 2.97 | 14.29 | N/A | N/A | 1.85 | 8.89 |
| 1 | 5.28 | 25.38 | 2.10 | 10.10 | 1.72 | 8.25 | 1.04 | 5.00 |
| 2 | 4.44 | 21.33 | 1.76 | 8.45 | 1.28 | 6.16 | 0.64 | 3.09 |
| 3 | 4.18 | 20.10 | 1.56 | 7.50 | 0.98 | 4.73 | 0.47 | 2.26 |
| 4 | 3.78 | 18.15 | 1.46 | 7.00 | 0.60 | 2.88 | 0.26 | 1.26 |

TABLE 2-continued

| | Roll #1 | | Roll #2 | | Roll #3 | | Roll #4 | |
|---|---|---|---|---|---|---|---|---|
| Impression (mils) | Dry Thickness (μm) | Wet Thickness (μm) | Dry Thickness (μm) | Wet Thickness (μm) | Dry Thickness (μm) | Wet Thickness (μm) | Dry Thickness (μm) | Wet Thickness (μm) |
| 5  | 3.65 | 17.56 | 1.36 | 6.56 | 0.48 | 2.31 | 0.22 | 1.08 |
| 6  | 3.35 | 16.08 | 1.27 | 6.09 | 0.41 | 1.98 | 0.16 | 0.78 |
| 7  | 3.27 | 15.70 | 1.28 | 6.15 | 0.56 | 2.69 | 0.16 | 0.75 |
| 8  | 3.12 | 15.01 | 1.19 | 5.70 | 0.47 | 2.25 | 0.11 | 0.52 |
| 9  | 3.02 | 14.50 | 1.18 | 5.69 | 0.52 | 2.51 | N/A  | N/A  |
| 10 | 2.94 | 14.13 | 1.11 | 5.34 | 0.48 | 2.31 | N/A  | N/A  |

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about."

Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. A method, comprising:
   providing a first roll, a second roll, and a nip formed between the first and second rolls;
   supplying a coating liquid and a substrate to the nip, wherein the substrate wraps one of the first and second rolls; and
   smoothing the coating liquid, via a film split of the coating liquid at the nip, into a substantially uniform layer of liquid coating,
   wherein the first roll comprises a metal shell and a resilient layer, the metal shell encases the resilient layer therebeneath, and
   wherein the metal shell is elastically deformable, and under a contact with the second roll to deflect in unison with the resilient layer.

2. The method of claim 1, wherein the layer of liquid coating on the substrate has a thickness no greater than about 5 microns.

3. The method of claim 1, wherein the metal shell is configured to be removable from the first roll.

4. The method of claim 1, wherein the first roll further comprises a rigid central core, and the resilient layer has substantially uniform thickness about the periphery of the rigid central core.

5. The method of claim 1, wherein the substrate is a web of indefinite length, and the method further comprises wrapping the web around one of the first and second rolls.

6. The method of claim 1, further comprising determining a line speed at which one of the first and second rolls is rotated, a predetermined line speed and the viscosity of the coating liquid are such that a calculated capillary number Ca for the coating is greater than a critical value.

7. The method of claim 6, wherein the critical value of the capillary number Ca is in the range from about 0.1 to about 2, and the capillary number Ca is no greater than 500.

8. The method of claim 1, wherein the metal shell comprises nickel.

9. The method of claim 1, wherein the metal shell has a thickness between about 0.1 mm and about 1 mm.

10. The method of claim 1, wherein the resilient layer is compressible and capable of preventing slip between the metal shell and the resilient layer.

11. The method of claim 1, wherein the resilient layer includes a patterned elastomer.

12. A coating apparatus, comprising:
    a first roll comprising a metal shell and a resilient layer, the metal shell encases the resilient layer therebeneath;
    a second roll forming a nip with the first roll such that the metal shell is capable of being elastically deformed at the nip by contact with the second roll; and
    a liquid delivery system disposed to supply coating liquid into the nip,
    wherein a substrate is provided to wrap one of the first and second rolls, and the metal shell is elastically deformable, and under a contact with the second roll to deflect in unison with the resilient layer.

13. The coating apparatus of claim 12, wherein the metal shell is configured to be removable from the layer of resilient material.

14. The coating apparatus of claim 12, wherein the first roll further comprises a rigid central core, and the resilient layer has substantially uniform thickness about the periphery of the rigid central core.

15. The coating apparatus of claim 12, wherein the metal shell comprises nickel.

16. The coating apparatus of claim 12, wherein the metal shell has a thickness between about 0.1 mm and about 1 mm.

17. The coating apparatus of claim 12, wherein the ratio between the thickness of the metal shell and the diameter of the first roll is between 1:15000 and 1:80.

18. The coating apparatus of claim 12, wherein the second roll is a rigid roll.

19. The coating apparatus of claim 12, further comprising a rotation mechanism configured to rotate one of the first and second rolls at a predetermined line speed, wherein a predetermined line speed and the viscosity of the coating material are such that a calculated capillary number Ca for the coating is greater than a critical value, and the critical value is about 0.1 or more.

20. The coating apparatus of claim 12, wherein the resilient layer is compressible and capable of preventing slip between the metal shell and the resilient layer.

* * * * *